Dec. 4, 1934. P. R. BASSETT ET AL 1,982,851
FLIGHT INDICATOR
Original Filed May 23, 1929   3 Sheets-Sheet 1
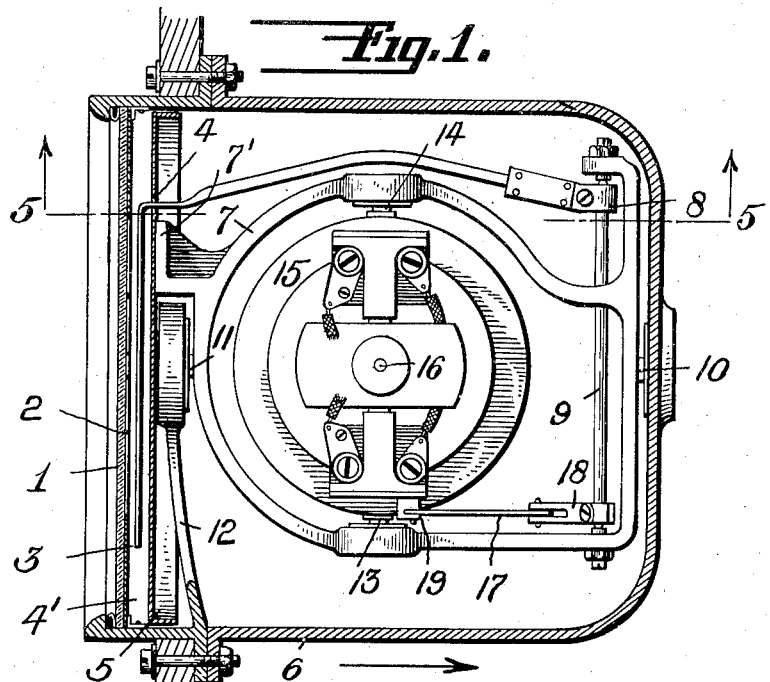
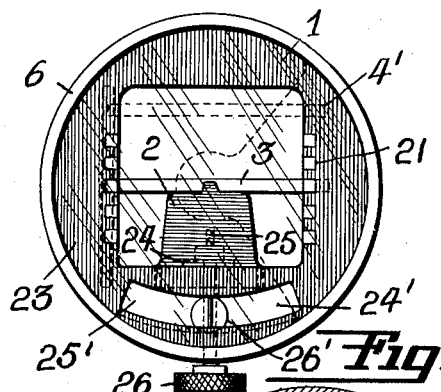
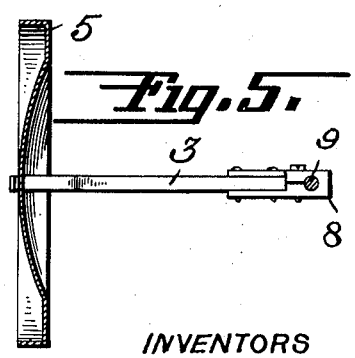
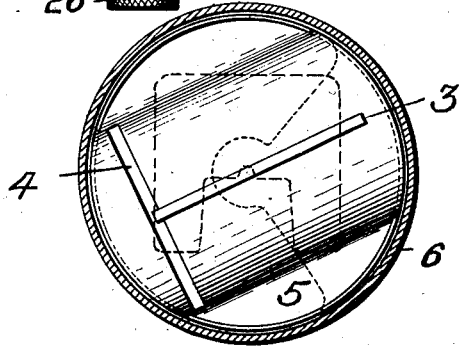
INVENTORS
ELMER A. SPERRY, JR.
PRESTON R. BASSETT.
BY Herbert H. Thompson
THEIR ATTORNEY.

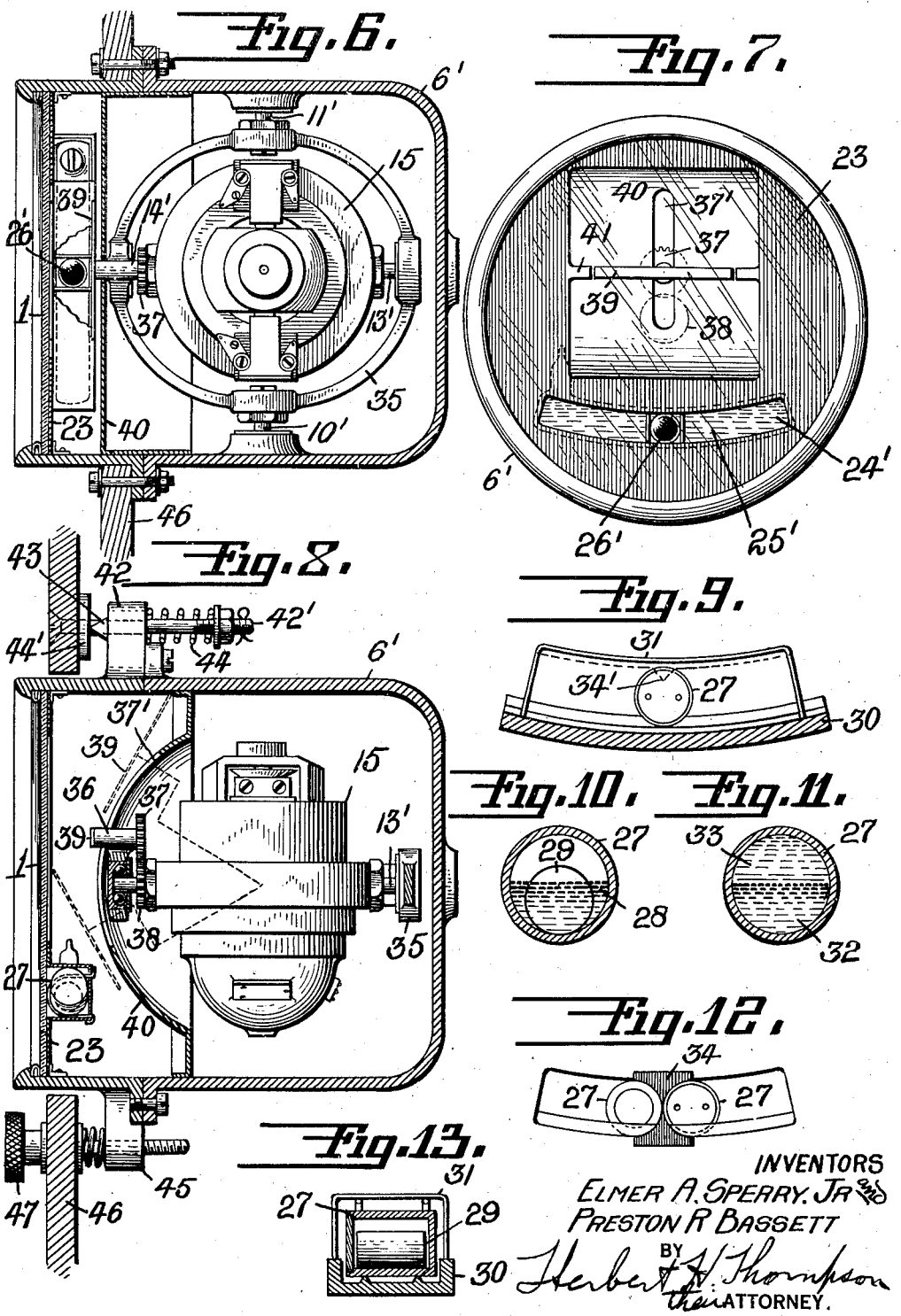

Dec. 4, 1934.   P. R. BASSETT ET AL   1,982,851
FLIGHT INDICATOR
Original Filed May 23, 1929   3 Sheets-Sheet 3
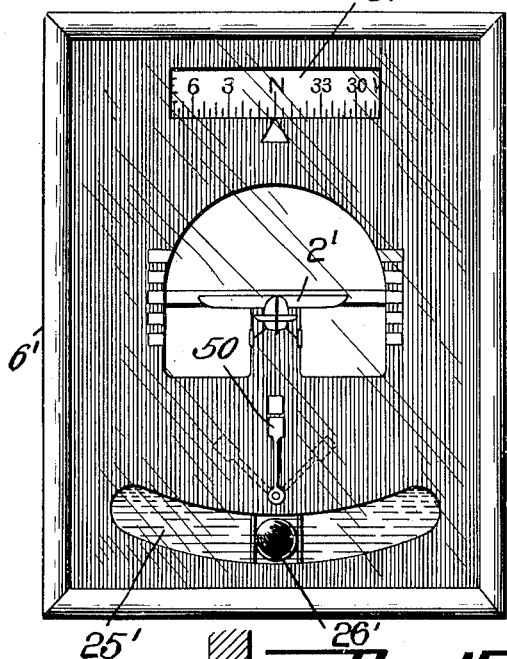
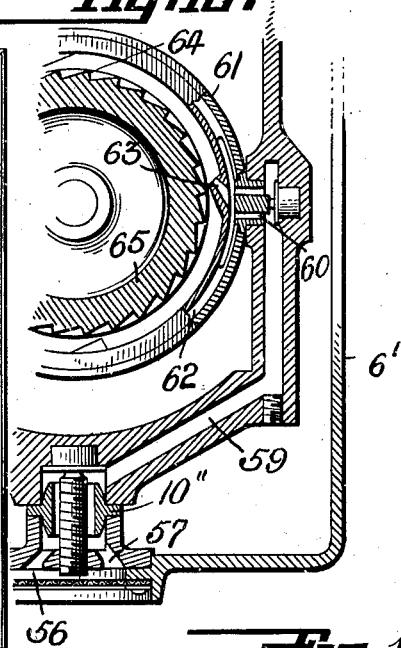
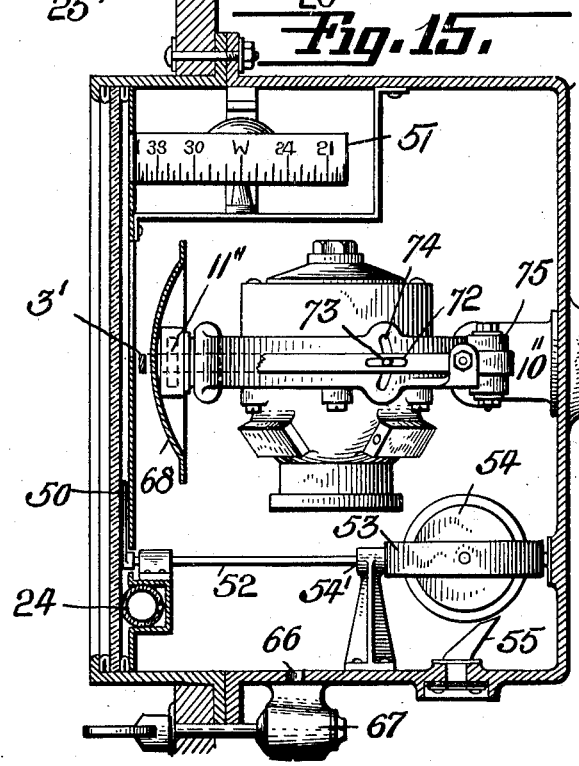
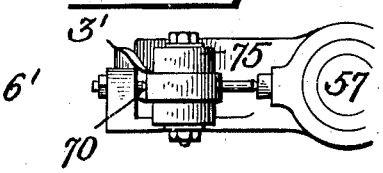
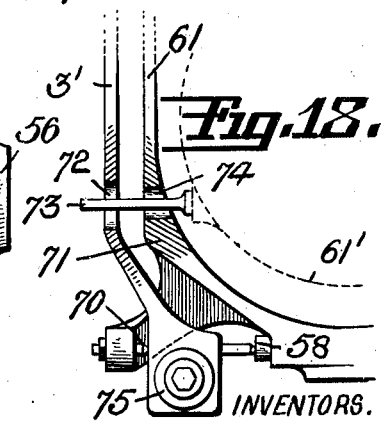
INVENTORS.
ELMER A SPERRY, JR &
PRESTON R BASSETT
BY
Herbert H. Thompson
their ATTORNEY.

Patented Dec. 4, 1934

1,982,851

UNITED STATES PATENT OFFICE 1,982,851

FLIGHT INDICATOR

Preston R. Bassett, Rockville Center, and Elmer A. Sperry, Jr., Brooklyn, N. Y., assignors to Sperry Gyroscope Company, Inc., Brooklyn, N. Y., a corporation of New York Application May 23, 1929, Serial No. 365,460
Renewed August 25, 1934

15 Claims. (Cl. 33—204)

This invention relates to navigational instruments for aircraft, and especially to an instrument designed to aid the aviator when flying "blind" in a fog or cloud, or at night when no land marks are visible. Perhaps the most essential and difficult feature when flying "blind" is to keep the airplane in the proper attitude of flight, since in a fog the aviator may lose all sense of true vertical and his plane get into a dangerous position leading to side slips, tail spins, nose dives, etc., before he has become aware of his position. One of the principal objects of this invention, therefore, is to give the aviator a simple, reliable indicator which he may use as an artificial horizon when flying "blind" and whch can be thus interpreted by the aviator even when the latter becomes fatigued through long observation of his instruments. We are aware that many such devices have been proposed, but in all of them the indicators were of such a nature that they have to be "interpreted" by the pilot. While such instruments may record satisfactorily the vertical, they have not come into general use for the reason that airplane pilots have found that it is difficult to interpret such instruments. The purpose of the present invention, however, is to eliminate the necessity of the pilot converting in his own mind an instrument indication into terms of his normal reaction when flying with full visibility by making the instrument simulate the normal appearance of level daylight flying to the pilot. We have found that pilots develop unconsciously a reaction to hold the plane horizontal by observing the horizon whether it be the real horizon or a cloud or haze horizon. He does this naturally and without mental effort. By our invention we construct an artificial horizon so that the pilot has the same reaction in looking at it as when looking at the real horizon. The face of our instrument simulates a window or port-hole which the pilot looks through and the artificial horizon appears in the form of a normally horizontal strip or bar preferably extending entirely across the face of the window or opening in the mask and which moves up and down or tilts to the right and left exactly as the real horizon appears to do. Preferably nothing is visible through the window except this artificial horizon and some reference member such as the semblance of some portion of the plane. The pilot is thus constantly aware of which element represents the ship and which element is indicating the horizon, while in all prior instruments, of which we are aware, the pilot may become confused as to whether he should control the ship to bring the movable marker to datum on the dial or to bring the datum to the marker.

A further object of the invention is the provision of a combination of indicators in one instrument whereby the aviator may at one glance take in all the facts relating to the flight he needs without referring to a number of separate instruments. Further objects of the invention will become apparent from the following description.

Referring to the drawings in which several preferred forms of the invention are shown:—

Fig. 1 is a sectional plan view showing one form of artificial horizon.

Fig. 2 is a vertical face view of the same.

Fig. 3 is a vertical section with the face removed and showing the position the indicator assumes when the plane is tilted laterally.

Fig. 4 is a detail showing the connection between the gyro and the "artificial horizon" or indicator.

Fig. 5 is a detail vertical section through the face of the instrument on approximately line 5—5 of Fig. 1.

Fig. 6 is a horizontal section similar to Fig. 1 of a modified form of indicator.

Fig. 7 is a face view of the same.

Fig. 8 is a vertical section of the same.

Fig. 9 shows a modified form of banking indicator which may be used in our device.

Fig. 10 is a cross section through the roller used in such indicator.

Fig. 11 is a similar cross section through a modified form of roller.

Fig. 12 shows still a further modification of banking indicator employing a pair of rollers.

Fig. 13 is a transverse vertical section through the form of banking indicator shown in Fig. 9.

Fig. 14 is a face view of still another form showing our preferred combined indicator.

Fig. 15 is a vertical section through the casing of the same.

Fig. 16 is a horizontal section through the artificial horizon gyroscope.

Figs. 17 and 18 are details of the same.

As above indicated, we prefer to employ, to indicate the horizontal, an indicator 1 representing the forward outlook from an airplane and in which is placed a part 2 representing a fixed part of the plane. In Fig. 2 this is shown as a representation of the housing of the engine which the aviator looks over, while in Fig. 14 it is shown as a representation of an airplane 2'. In both figures the horizon is represented by a normally horizontal bar 3 normally positioned just above or in line with the part 2 or 2' forming a part of or connected to the face or fixed shield 4'. Said bar 3 is preferably mounted both for up and down movement and for tilting or turning about its central point and is so connected to a gyroscope or other baseline that it will move up and down or tilt clockwise or counterclockwise just as the horizon appears to the aviator to do as his plane pitches or rolls. Said bar preferably extends entirely across the opening in the front shield 4'.

In Fig. 1 the bar 3 is shown as bent at right angles at one end where it projects through a normally vertical slot 4 in the back piece or mask 5 of the indicator portion of the instrument. Said backing 5 in connection with the front shield 4' preferably conceals all the interior mechanism, even the slot 4 being invisible from the front. In order not to interfere with the tilting of the bar 3 with the gyroscope, said mask 5 is also rotatably mounted within the housing 6 as by being secured to the outer frame or gimbal 7 of the gyroscope. As shown, the gimbal 7 is provided with an extension 7' to which the mask 5 may be riveted or otherwise secured. Said plate is also preferably crowned in the vertical plane as shown in Figs. 3 and 5 so as to maintain it at an equal distance from the bar 3 as the latter moves up and down. After passing through the slot 4, the bar 3 extends rearwardly through the casing 6 and is so connected with the gyroscope as to be moved in the opposite direction to the apparent movement of the gyroscope as the plane pitches or rolls. The angle of pitch especially near the zero or horizontal position is also magnified in this arrangement. As shown, the inner end of said bar is provided with a clamp 8 secured to a rod 9 pivotally mounted in an extension from the gimbal ring 7. The gimbal ring in turn is shown as pivoted at 10 and 11 within the casing 6, the forward pivot being shown as provided by an arm 12 extending inwardly from the casing. The gyroscope in turn is pivoted on a horizontal axis 13—14 within the gimbal ring and preferably at right angles to axis 10—11. The gyroscope proper 15 may be of any conventional form driven in any suitable manner. Only the exterior casing of the gyroscope is shown in Figs. 1, 6 and 8, it being understood that the rotor is suitably mounted within said casing on a normally vertical spinning axis 16 and is electrically driven. Connecting said casing 15 and rod 9 are a pair of links 17—18, the latter being clamped to the rod 9 and the former linked to an upstanding ear 19 on the gyro casing, the arrangement being such that the direction of rotation of shaft 9 is the reverse of that of the gyroscope about axis 13—14.

In Fig. 1 the fore-and-aft axis of the gyroscope lies in the direction of the arrow. As the plane rolls, therefore, the gyroscope, in that it remains fixed, would cause relative movement of the gimbal ring 7 with respect to the casing 6 about axis 10—11 and, therefore, the bar 3 would be rotated about this axis in the opposite direction of roll. On the other hand, when the plane pitches there will be relative movement between the gyroscope and the casing 6 and the gimbal ring 7 connected therewith about the axis 13—14. This, it will be seen, will result in rotating the rod 9 and thereby moving the bar 3 about the axis of rod 9 which appears as merely an up and down movement to the observer through the glass window 1. While the bar actually moves in the same direction as the pitch of the craft, the instrument is placed on the instrument board facing toward the rear (see arrow in Fig. 1) so that the artificial horizon moves in the same direction as the real horizon appears to move.

If desired, additional reference indications may be provided adjacent the window such as fixed markings 21, so that the aviator may observe the extent of the pitch and roll as well as the presence of the same.

We also find it desirable to make one of the indicators adjustable in order to provide for the variable attitudes that a ship flies in when loaded differently. For this purpose the reference member 2 is shown in Fig. 2 as slidably mounted behind the backing 23 of the window and is made adjustable by having a lug 24 thereon threaded in a stem 25 which extends without the casing and may be provided with a thumbpiece 26.

The bar 3 as a rolling or tilting indicator would not be of great service to the aviator unless the instrument would show him that the airplane is improperly inclined. In case the airplane is turning, it is, of course, necessary to bank the plane, and during such time the bar 3 might be misinterpreted by the pilot. To prevent this we are mounting in the same instrument and as a part thereof a banking indicator which may be in the form of a curved glass tube 24' containing a liquid 25' and a ball or roller 26'. As the ball is subject to centrifugal force as well as tilt it will show approximately the correct banking angle and such devices are usually referred to as banking indicators. We employ our instrument, however, principally as a check on our roll indicator which is not influenced by turning of the plane and, therefore, cannot show alone whether the plane is inclined correctly due to turning or incorrectly due to any other cause. For the same purpose, instead of or in addition to the liquid level type of banking indicator we may employ a turn indicator of a gyroscopic type which will show at a glance whether the plane is flying straight or turning. This form of the invention is shown in Figs. 14 and 15 and will be described more in detail hereinafter.

In Figs. 9 to 13 are shown several modified forms of banking indicator. Instead of a solid steel ball immersed in liquid, as shown in Fig. 7, Figs. 9, 10 and 13 show a hollow metal roller 27 which is partially filled with a liquid 28 and contains a smaller roller or ball 29. The outer roller 27 is mounted on a curved track 30 and may be held in place by an upper guide-way 31. Such a roller we have found possesses certain advantages over a roller immersed in a liquid. Where there is a large inclination the roller will roll quickly to the central point but subsequent oscillations will be damped out quickly so that under such conditions it will reach a position of rest in shorter time than the roller in Fig. 7. The reason is probably that when the roller 27 picks up certain critical speed, the smaller roller and liquid within the same revolve with it, but as soon as this critical speed drops down the inner roller and liquid cease to revolve about the same center and act as a heavy drag on the outer roller. At the same time they do not in any way interfere with the roller coming to rest in the exactly correct position.

In Fig. 11 a further modification is shown wherein the outer roller 27 contains two liquids, a heavy liquid 32, such as mercury, and a lighter liquid 33, somewhat viscous, such as glycerin or a mixture of glycerin and alcohol or oil.

Fig. 12 shows a further modification in which a pair of rollers is used, one of which is preferably constructed as in Figs. 10 and 11 and the other may be a plain solid steel roller. The two rollers together seem to act as practically one, the former operating as a drag on the latter. Where two rollers are employed, a V-shaped index 34 may be employed with reference to which the position of the rollers is read.

Our indicator may, of course, assume other forms than shown in Fig. 1 as long as the proper relative motion is secured between the artificial horizon and the representation of the plane. In Fig. 1 the artificial horizon is given the motion, while in Figs. 6, 7 and 8 we cause the reverse to be true. In these figures the gimbal ring 35 has its outer axis 10'—11' at right angles to its axis in Fig. 1, while the gyroscope 15 within the same is journaled on the fore and aft axis 13'—14'. Mounted on the gimbal ring 35 above the journal 14' is a stub shaft 36 provided with a gear 37 meshing with a gear 38 on the shaft 14' of the gyroscope. Said stub shaft 36 projects through a vertical slot 37' in the crowned inner face 40 of the device and has secured thereto a normally horizontal bar 39 representing in this case the airplane or a part thereof. Said bar is read in connection with reference members 41 on said face. The said face is shown as curved about a center of oscillation of the gyroscope, the bar 39 assuming the limiting position shown in dotted lines in Fig. 8 upon the combined severe pitch and roll of the plane.

In this form of the invention the bar 39 moves up and down with the rear side of the gyroscope (i. e. oppositely to the forward side thereof) and hence it moves oppositely to the apparent movement of the horizon. The tilting motion is also reversed by gearing 37, 38. In this form of the invention also adjustment of the device is secured for different loading of the plane by mounting the whole instrument adjustably on the instrument board. For this purpose the casing 6' is shown as provided on its top with an extending lug 42 from which extends a pair of spaced knife edges or points 43. Between said knife edges a bolt 42' extends through the lug and is secured to the panel 46. A compression spring 44 between a nut on said bolt and said lug presses said knife edges tightly against the hard steel plate 44' on the panel which acts as a pivot for the instrument. At its bottom the plate is provided with a further lug 45 which is adjustable toward or away from panel 46 by a thumb screw 47 threaded therein. It will be readily apparent that by turning the thumb screw that the inclination of the casing 6' with respect to the plane may be readily varied.

In Figs. 14 to 18 above referred to, the indicator in general is of the same form as in Fig. 1. The gyroscope, however, in this instance is shown as air-driven instead of electrically driven and as stated above there is a turn indicator 50 incorporated in the instrument and also a direction indicator, such as a magnetic compass 51, either or both of which may be used in connection with the artificial horizon to tell whether the craft is flying in a straight line or not. The gyroscope is preferably of the air-damped type, such as shown in the patent to Sperry No. 1,651,845 of December 6, 1927. The turn indicator may be of the conventional gyroscopic type, the indicator proper 50 being shown as mounted on a shaft 52 extending from the ring or casing 53 of the gyroscope 54, which is pivoted on a fore-and-aft axis 54', providing the two degrees of freedom usual in such gyroscopes. The gyroscope is preferably air driven from the nozzle 55 in communication with the exterior of the main casing 6'.

For driving the horizon gyroscope we have shown the casing 6' as provided with a second aperture 56 (Fig. 16) connected with passages 57 through one of the horizontal bearings 10" of the gimbal ring leading to a passage 59 through the gimbal and from thence through the horizontal bearing 60 of the gyro casing 61 within the gimbal. Said casing in turn is provided with a circular passage 62 having one or more jets 63 for directing air against the buckets 64 cut in the periphery of the gyro wheel 65. Air is withdrawn from the entire casing through aperture 66 and valve 67 so that atmospheric pressure will force air in through the nozzles 55 and 63 to drive the rotors of both the horizon and turn indicator gyroscopes. The artificial horizon bar 3' in this instance is also mounted in a somewhat different manner from that in Fig. 1. In this case a bar 3' extends out to one side or beyond the crowned backing 68 and from thence extends rearwardly past the gyro-casing where it is pivoted at 70 on the outer gimbal 71 of the gyroscope. Said extension is counter-balanced by weight 75' and is also provided with a horizontal slot 72 into which extends a pin 73 from the gyro case 61', said pin passing through a substantially vertical curved slot 74 in the gimbal 61. It will readily be seen, therefore, that as the housing 6' pitches with respect to the gyroscope the bar 3' will be moved up and down by the aforesaid pin connection of the gyro case, while if the casing rolls with respect to the gyroscope the bar 3', being firmly pivoted to the gimbal ring, will rotate with it about its outer horizontal pivots 58. In this case also a large movement is given the bar for small pitching movements, especially near the center.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An artificial horizon for aircraft including a fixed indicator representing a normally horizontal position of the aircraft, a cooperating indicator representing the horizon mounted closely adjacent thereto for up and down and tilting movements with respect to said fixed indicator, a gyroscope freely mounted about horizontal axes, and means connecting said gyroscope and movable indicator including means for converting relative pitching of the aircraft and gyroscope into up and down movement of said movable indicator in the same direction as the real horizon appears to move for a corresponding direction of pitch of the craft and for converting relative rolling of the aircraft and gyroscope into like apparent tilting of said indicator.

2. An artificial horizon for aircraft comprising an indicator representing a normally horizontal portion of the aircraft, a cooperating normally horizontal bar mounted closely adjacent said first-named indicator and representing the horizon or datum, means for mounting said bar for relative up and down movements, a gyroscope freely mounted about horizontal axes, and means connecting said gyroscope and movable indicator whereby relative pitching of the aircraft and gyroscope causes up and down movement of said indicator in the same direction as the apparent movement of the real horizon as seen from the aircraft for a corresponding direction of pitch of the craft.

3. An artificial horizon adapted to be mounted on the instrument board of an aircraft facing the pilot including a fixed indicator representing a normally horizontal position of the aircraft, a cooperating indicator representing the horizon mounted for up and down and tilting movements with respect to said fixed indicator, a gyroscope freely mounted about horizontal axes, and means connecting said gyroscope and movable indicator, said means including connections for causing by relative pitching of the aircraft and gyroscope actual up and down movement of said movable indicator in the same direction as the apparent movements of the real horizon as seen from the craft, for a corresponding direction of pitch of the craft.

4. An artificial horizon for aircraft including a fixed indicator representing a normally horizontal position of the aircraft, a cooperating indicator representing the horizon mounted for up and down and tilting movements, with respect to said fixed indicator, a gyroscope, a gimbal mounting therefor having its outer axis parallel with the fore and aft axis of the craft, the gyroscope being pivoted therein on a transverse axis, said indicating member being pivoted on said gimbal mounting so as to partake of the apparent tilting of the gimbal about said fore and aft axis, and means connecting said gyroscope and indicator for moving the latter up and down oppositely to the apparent movement of said gyroscope about said transverse axis whereby said indicator is moved in the same direction as the real horizon appears to move.

5. An artificial horizon comprising a gyroscope freely mounted for oscillation about fore and aft, and lateral axes on the craft, a normally horizontal indicator observable by looking toward the front of the craft, means connecting said indicator to the rear of said gyroscope so as to move it down as the front of said gyroscope goes up and vice versa, and means also connecting said gyroscope and indicator for laterally tilting the same in the same direction as the apparent tilt of the gyroscope.

6. In a gyro vertical for aircraft, the combination with a gyroscope mounted on the craft for oscillation about a fore and aft and a transverse axis and a housing therefor, of a normally horizontal bar connected to said gyroscope about both said axes so as to be moved up and down upon pitching of the craft and to be tilted upon banking of the craft, and a mask to the rear of said bar and connected to said gyro to tilt about said fore and aft axis, said mask concealing said gyroscope and forming a background for said bar.

7. In a gyro vertical for aircraft, the combination with a gyroscope mounted on the craft for oscillation about a fore and aft and a transverse axis and a housing therefor, of a normally horizontal bar connected to said gyroscope about both said axes so as to be moved up and down upon pitching of the craft and to be tilted upon banking of the craft, a mask to the rear of said bar and having a slot therein to one side thereof and connected to said gyro to tilt about said fore and aft axis, said bar projecting through said slot, said mask concealing said gyroscope and forming a background for said bar, and a shield on the face of said housing concealing said slot in said mask.

8. A horizon indicator for aircraft including a pair of cooperating relatively movable indicators, one of which is fixed on the craft and the other mounted for both up and down and tilting movements with respect to said fixed indicator, a gyroscope including a gimbal mounting therefor having its major axis parallel with the fore and aft axis of the craft and its minor axis transverse thereto, a rearward extension on said movable indicator, a pivotal mounting for said extension on said gimbal on the opposite side of said minor axis from the indicator, and means connecting said gyroscope and indicator to move the latter up and down in the opposite direction to the apparent movements of the gyroscope.

9. In an artificial horizon for airplanes, a gyroscope, a gimbal ring mounting therefor having its major axis trunnions fore and aft of the airplane and minor axis trunnions lateral, a lever pivoted on said gimbal ring about an axis normally parallel to said minor axis and to the rear thereof, a normally horizontal indicator bar mounted at the forward end of said lever and a pin and slot connection between said gyroscope and lever whereby said indicator bar is moved up and down for pitching of the craft and tilts laterally for rolling of the craft.

10. An artificial horizon for aircraft adapted to be mounted on the instrument board thereof comprising a face on the rear of the instrument as mounted on the craft, a normally horizontal member extending substantially across said face and mounted to be elevated vertically and/or tilted horizontally relatively to said face, stabilizing means in front of said face, and means including a pivoted link connection between said member and the forward part of the stabilizing means, causing said member to be moved up and down and to be tilted by the pitching and tilting of the craft respectively and in the same direction as the real horizon appears to move for a corresponding movement of the craft.

11. An artificial horizon instrument for aircraft including a pair of indicating elements mounted for relative movement one over the other for direct view, one of said indicators being fixed to the instrument and a gyroscope for imparting both up and down and tilting movements to the other indicator and a linkage connection between the opposite side of the gyroscope from said indicator and said indicator whereby said indicator is moved in the same direction as the real horizon appears to move upon both pitching and banking.

12. In an artificial horizon for aircraft, a gyroscope, an indicator stabilized thereby about both lateral and longitudinal axes, a reference index therefor to show at least pitch about said lateral axis, and means for adjusting said index up or down for different loading of the craft.

13. In an artificial horizon for aircraft, a gyroscope, an indicator stabilized thereby about both lateral and longitudinal axes, a reference member therefor to show both pitch and roll when said indicator is read in connection therewith, and means for adjusting said member up and down to compensate for different loading of the craft.

14. In an artificial horizon for airplanes, a gyroscope, a gimbal ring mounting therefor having its major axis trunnions fore and aft of the airplane and minor axis trunnions lateral, a lever pivoted on said gimbal ring about an axis normally parallel to said minor axis and to the rear thereof, a normally horizontal indicator bar mounted at the forward end of said lever, and a connection between a point on the gyroscope and said lever such as to give said bar a magnified pitching movement on slight apparent pitching of the gyroscope near its normal position.

15. In an artificial horizon for airplanes, a gyroscope, a gimbal ring mounting therefor having its major axis trunnions fore and aft of the airplane and minor axis trunnions lateral, a lever pivoted on said gimbal ring about an axis normally parallel to said minor axis and to the rear thereof, a normally horizontal indicator bar mounted at the forward end of said lever, and a pin and slot connection between a point on said gyroscope to the rear of said minor axis and a point of said lever between the lever pivot and said indicator bar, whereby the pitching of the craft is magnified by said bar and said bar moves in the same apparent direction as the real horizon.

PRESTON R. BASSETT.
ELMER A. SPERRY, Jr.